United States Patent
Ikematsu et al.

(10) Patent No.: US 12,497,191 B2
(45) Date of Patent: Dec. 16, 2025

(54) AIRCRAFT LIGHTNING PROBABLE AREA DETECTION DEVICE, AIRCRAFT LIGHTNING PROBABLE AREA TRANSMISSION SYSTEM, AIRCRAFT LIGHTNING PROBABLE AREA DETECTION METHOD, AND AIRCRAFT LIGHTNING PROBABLE AREA DETECTION PROGRAM

(71) Applicant: MITSUBISHI HEAVY INDUSTRIES, LTD., Tokyo (JP)

(72) Inventors: Takashi Ikematsu, Tokyo (JP); Hiroyuki Katou, Tokyo (JP); Masato Ikehata, Tokyo (JP); Hiroyuki Nishijima, Tokyo (JP); Fumiya Homma, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 241 days.

(21) Appl. No.: 18/192,377

(22) Filed: Mar. 29, 2023

(65) Prior Publication Data
US 2024/0083591 A1    Mar. 14, 2024

(30) Foreign Application Priority Data
Sep. 8, 2022  (JP) ................. 2022-143083

(51) Int. Cl.
*B64D 45/00* (2006.01)
*B64D 43/00* (2006.01)

(52) U.S. Cl.
CPC ............. *B64D 45/00* (2013.01); *B64D 43/00* (2013.01)

(58) Field of Classification Search
CPC ........... G08G 5/76; B64D 45/00; B64D 43/00
(Continued)

(56) References Cited

U.S. PATENT DOCUMENTS

| 5,265,024 A * | 11/1993 | Crabill ................. G05D 1/0055 |
| | | 701/538 |
| 2018/0047294 A1 * | 2/2018 | Esposito ................. G08G 5/21 |
| 2023/0022975 A1 | 1/2023 | Yoshikawa |

FOREIGN PATENT DOCUMENTS

| EP | 3657473 A1 * | 5/2020 | ......... G01C 21/3407 |
| JP | 2021043789 A * | 3/2021 | |

(Continued)

OTHER PUBLICATIONS

Carl D. Dunn. "Weather Data Processing: Display of Aviation Weather." Jul. 9, 2008. 2008 Integrated Communications, Navigation and Surveillance Conference. pp. 1-9. (Year: 2008).*

(Continued)

*Primary Examiner* — Matthias S Weisfeld
*Assistant Examiner* — Hyang Ahn
(74) *Attorney, Agent, or Firm* — Osha Bergman Watanabe & Burton LLP

(57) ABSTRACT

Provided are an aircraft lightning probable area detection device, an aircraft lightning probable area transmission system, an aircraft lightning probable area detection method, and an aircraft lightning probable area detection program that suppress the data capacity and create an aircraft lightning probable area that enables intuitive understanding of aircraft lightning probable. An aircraft lightning probable area detection device includes: an information acquisition unit configured to acquire aircraft lightning probable information indicating a level of an expected lightning strike probability on a map; a data creation unit configured to create text data of an aircraft lightning probable area information on which the level of the expected lightning strike probability and a location are associated with each other by using the aircraft lightning probable information; and a (Continued)

transmission unit configured to transmit the text data to an aircraft.

11 Claims, 6 Drawing Sheets

(58) Field of Classification Search
USPC .............................................. 701/3
See application file for complete search history.

(56) References Cited

FOREIGN PATENT DOCUMENTS

| JP | 2021-124468 A | 8/2021 | |
|---|---|---|---|
| WO | WO-0236428 A2 * | 5/2002 | ......... H04B 7/18506 |

OTHER PUBLICATIONS

"SIGMET Quick Reference Guide WS SIGMET." Nov. 4, 2016, ICAO, www.icao.int/APAC/Documents/edocs/WS-SIGMET.pdf (Year: 2016).*

* cited by examiner

AIRCRAFT LIGHTNING PROBABLE AREA DETECTION DEVICE, AIRCRAFT LIGHTNING PROBABLE AREA TRANSMISSION SYSTEM, AIRCRAFT LIGHTNING PROBABLE AREA DETECTION METHOD, AND AIRCRAFT LIGHTNING PROBABLE AREA DETECTION PROGRAM

CROSS-REFERENCE TO RELATED APPLICATIONS

This application claims foreign priority benefits under U.S.C. § 119 to Japanese Patent Application No. 2022-143083 filed on Sep. 8, 2022, the contents of which is hereby incorporated by reference in its entirety.

1. TECHNICAL FIELD

Background

The present disclosure relates to an aircraft lightning probable area detection device, an aircraft lightning probable area transmission system, an aircraft lightning probable area detection method, and an aircraft lightning probable area detection program.

2. DESCRIPTION OF RELATED ART

Operations of aircrafts have often suffered from damage by lightning strikes. Even when an aircraft is struck by lightning, design of an aircraft prevents the aircraft from falling into a situation of being unable to continue to fly, but damage to the fuselage and schedule delays are inevitable. For example, recently, the number of aircrafts manufactured by using many composite materials has been increased, and this has increased an impact of a lightning strike on the fuselage. A lightning strike causes damage to the fuselage, and this requires replacement of structure members and equipment. In addition, in the event of a lightning strike, it is essential to inspect a fuselage in order to ensure safety of the next operation. This will result in schedule delays of subsequent aircrafts due to a need of inspection and repair work.

To address this, it is considered to acquire prediction information on future lightning. Japanese Patent Application Laid-Open No. 2021-124468 discloses an information processing device that predicts a threat of future lightning based on weather observation data and/or weather prediction data, for example. Further, Japanese Patent Application Laid-Open No. 2021-43789 discloses that an air traffic controller provides an instruction to an aircraft by using information related to lightning provided by an aviation service supporting device or transmits an instruction to an aircraft via a network.

In the art of Japanese Patent Application Laid-Open No. 2021-124468, however, it is assumed to perform calculation at an information processing device installed in an airport or an aircraft, and no consideration is given to transmission of data from the ground to the aircraft. Further, in the art of Japanese Patent Application Laid-Open No. 2021-43789, an instruction is transmitted from air traffic control on the ground to the aircraft or data is transmitted to the aircraft via a network, but the data is expressed by images, which is complex and involves a large data volume. The network environment such as cockpit WiFi is often not deployed on an aircraft side, and even when cockpit WiFi or the like are mounted, it takes time to display complex image data in the current environment, and there is a problem of immediacy. Although the image data disclosed in Japanese Patent Application Laid-Open No. 2021-43789 and predicted lightning information that is three-dimensionally displayed have been considered, since the pilot's work is particularly complicated during takeoff and landing, there is no time to read and understand such complex data.

BRIEF SUMMARY

The present disclosure has been made in view of such circumstances, and an object is to provide an aircraft lightning probable area detection device, an aircraft lightning probable area transmission system, an aircraft lightning probable area detection method, and an aircraft lightning probable area detection program that can suppress the data capacity and further create an aircraft lightning probable area information that enables intuitive understanding of aircraft lightning probable.

To achieve the above object, the aircraft lightning probable area detection device, the aircraft lightning probable area transmission system, the aircraft lightning probable area detection method, and the aircraft lightning probable area detection program of the present disclosure employ the following solutions.

An aircraft lightning probable area detection device of the present disclosure includes: an information acquisition unit configured to acquire aircraft lightning probable information indicating a level of an expected lightning strike probability on a map; a data creation unit configured to create text data of an aircraft lightning probable area information on which the level of the expected lightning strike probability and a location are associated with each other by using the aircraft lightning probable information; and a transmission unit configured to transmit the text data to an aircraft.

An aircraft lightning probable area transmission system of the present disclosure includes: the aircraft lightning probable area detection device described above; and an output device provided to an aircraft. The output device includes a communication unit configured to receive text data transmitted from the aircraft lightning probable area detection device, and an output unit configured to output the received text data as map data.

In an aircraft lightning probable area detection method of the present disclosure, a computer performs: an information acquisition step of acquiring aircraft lightning probable information indicating a level of an expected lightning strike probability on a map; a data creation step of creating text data of an aircraft lightning probable area information on which the level of the expected lightning strike probability and a location are associated with each other by using the aircraft lightning probable information; and a transmission step of transmitting the text data to an aircraft.

An aircraft lightning probable area detection program of the present disclosure causes a computer to perform the aircraft lightning probable area detection method as described above.

According to the present disclosure, since information is transmitted in text data, the data capacity can be reduced. In addition, since the text data is a simplified display representing an overview, aircraft lightning probable can be intuitively recognized and understood.

DETAILED DESCRIPTION

One embodiment of an aircraft lightning probable area detection device, an aircraft lightning probable area transmission system, an aircraft lightning probable area detection method, and an aircraft lightning probable area detection program according to the present disclosure will be described below with reference to the drawings.

Some embodiments of the present disclosure will be described below with reference to FIG. 1.

Figure 1:
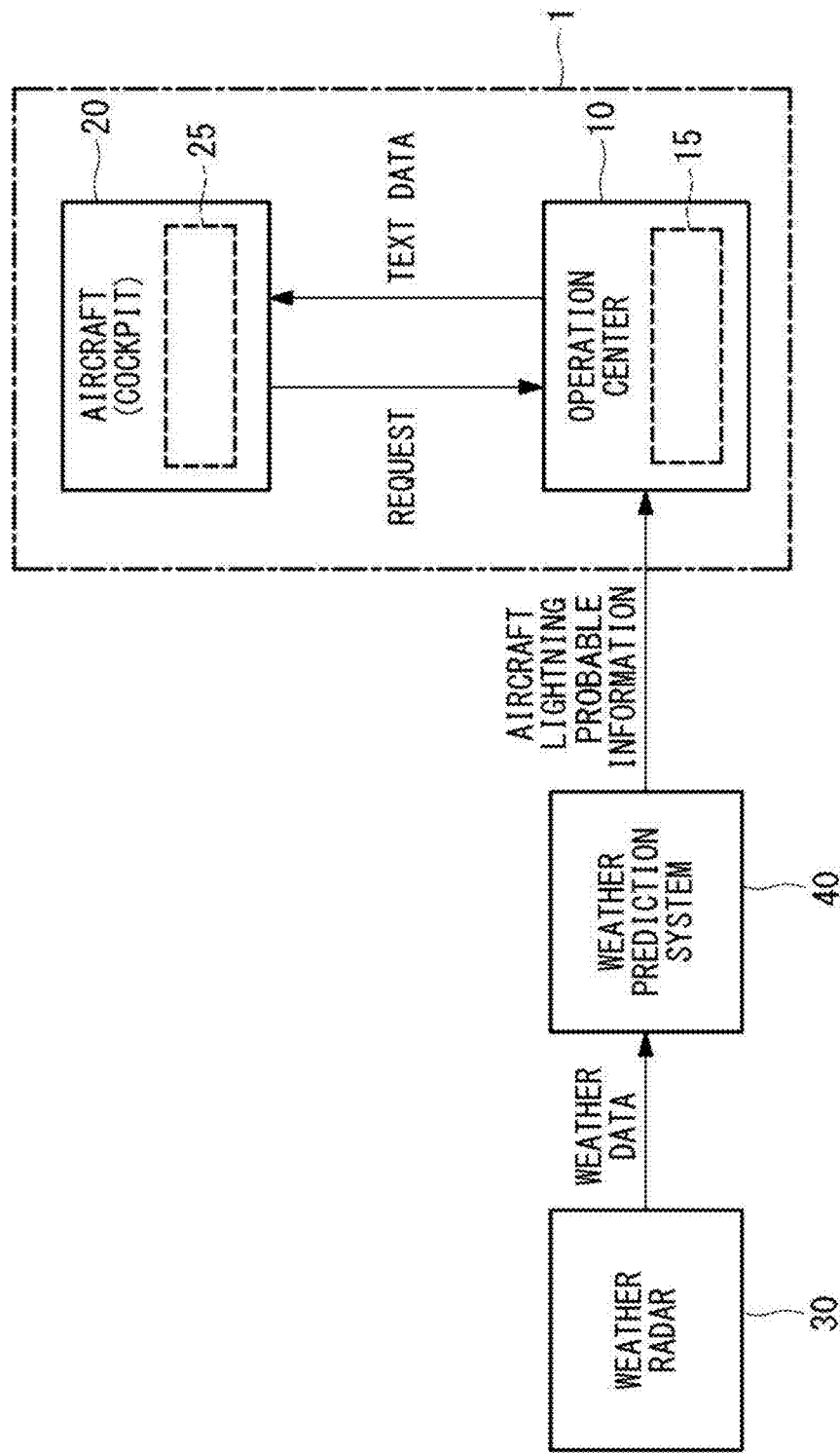
FIG. 1 is a schematic diagram of an aircraft lightning probable area transmission system in some embodiments of the present disclosure.

FIG. 1 is a schematic diagram of the aircraft lightning probable area transmission system in some embodiments of the present disclosure.

An aircraft lightning probable area transmission system 1 is a system provided to an operation center 10 on the ground and a cockpit of an aircraft 20. The aircraft lightning probable area transmission system 1 is represented by a dashed line in FIG. 1 for convenience. The aircraft lightning probable area transmission system 1 is implemented by an aircraft lightning probable area detection device 15 of the operation center 10 and an output device 25 of the aircraft 20.

The aircraft lightning probable area detection device 15 of the operation center 10 transmits an aircraft lightning probable area information as text data to the output device 25 of the aircraft 20. The output device 25 of the aircraft 20 requests the aircraft lightning probable area detection device 15 of the operation center 10 to transmit the aircraft lightning probable area information and then outputs the aircraft lightning probable area information received from the aircraft lightning probable area detection device 15. The aircraft lightning probable area information corresponds to text data in which expected lightning strike probabilities and locations are represented on a map format. Details of the aircraft lightning probable area information will be described later.

The output device 25 of the aircraft 20 communicates with the aircraft lightning probable area detection device 15 of the operation center 10 by using an aircraft communication addressing and reporting system (ACARS, data link system used for transferring a short message wirelessly or via satellite) that is mounted on most aircrafts 20, for example. Communication between the aircraft 20 and the operation center 10 may be any type of communication that can transfer text data.

When creation of an aircraft lightning probable area information is needed, the aircraft lightning probable area detection device 15 of the operation center 10 receives aircraft lightning probable information from a weather prediction system 40. The aircraft lightning probable information is information indicating the level of the expected lightning strike probability on the map. Details of the aircraft lightning probable information will be described later.

The weather prediction system 40 acquires weather data from a weather radar 30 and then creates aircraft lightning probable information based on the weather data. The weather prediction system 40 may be provided to a system deployed in the operation center 10, or the weather prediction system 40 of an external service may be used, and any weather prediction system may be used as long as information required for creating an aircraft lightning probable area information of the operation center 10 is included in the aircraft lightning probable information.

Figure 2:
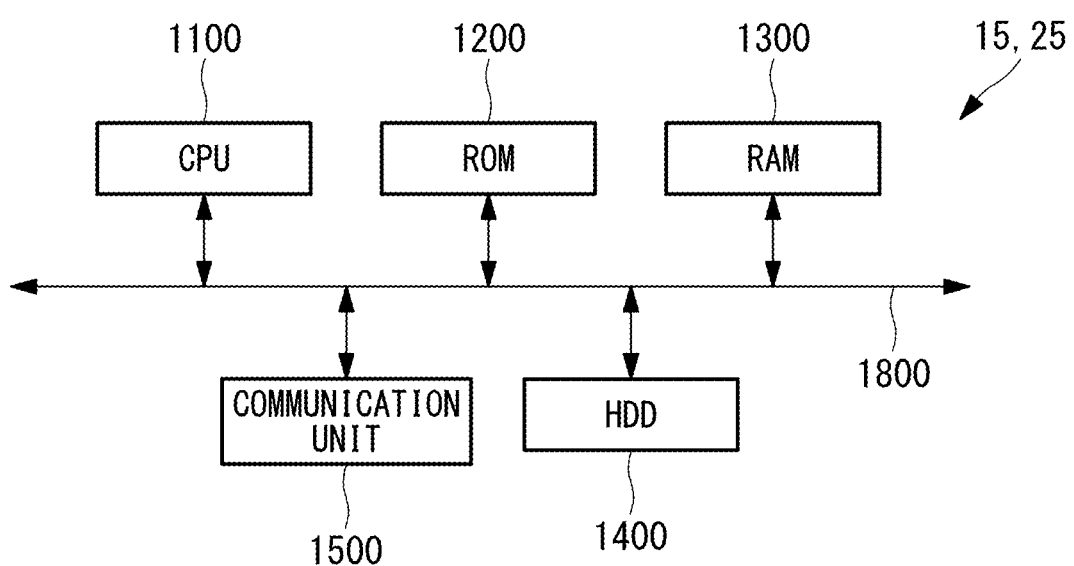
FIG. 2 is a diagram illustrating an example of a hardware configuration of the aircraft lightning probable area transmission system in some embodiments of the present disclosure.

FIG. 2 is a diagram illustrating an example of a hardware configuration of the aircraft lightning probable area transmission system in some embodiments of the present disclosure.

As illustrated in FIG. 2, the aircraft lightning probable area detection device 15 of the aircraft lightning probable area transmission system 1 is a computer system (computing system) and includes a central processing unit (CPU: processor) 1100, a secondary storage device (ROM, secondary storage: memory) 1200, a main memory device (RAM, main memory) 1300, a hard disk drive (HDD) 1400 as a large capacity storage device, and a communication unit 1500 for connecting to a network or the like, for example. Note that a solid state drive (SSD) may be used as the large capacity storage device. These units are connected to each other via a bus 1800.

The CPU 1100 controls the overall aircraft lightning probable area detection device 15 by operating system (OS) stored in the secondary storage device 1200 connected via the bus 1800 and performs various processes by executing various programs stored in the secondary storage device 1200, for example. One or a plurality of CPUs 1100 are provided and may cooperate with each other to implement processes.

The main memory device 1300 is formed of a rewritable memory such as a cache memory, a random access memory (RAM), for example, and is used as a working area where the execution program of the CPU 1100 is read or loaded, processing data caused by the execution program is written, or the like.

The secondary storage device 1200 is a non-transitory computer readable storage medium. For example, the secondary storage device 1200 is a magnetic disk, a magneto-optical disk, a CD-ROM, a DVD-ROM, a semiconductor memory, or the like.

Examples of the secondary storage device 1200 may be a read only memory (ROM), a hard disk drive (HDD), a solid state drive (SSD) flash memory, or the like. For example, the secondary storage device 1200 stores OS used for controlling the overall information processing device, such as Windows (registered trademark), iOS (registered trademark), Android (registered trademark), or the like, Basic Input/Output System (BIOS), various device driver used for hardware operations of peripheral devices, various application software, various data or files, and the like. Further, programs for implementing various processes or various data required for implementing various processes are stored in the secondary storage device 1200. A plurality of secondary storage devices 1200 may be provided, and the programs or the data as described above may be divided and stored in each of the secondary storage devices 1200.

The aircraft lightning probable area detection device 15 may further include an input unit formed of a keyboard, a mouse, or the like, a display unit formed of a liquid crystal display device or the like that display data, or the like.

Furthermore, the aircraft lightning probable area detection device 15 may include a notification unit including an indicator unit such as a lamp and a speaker that outputs a sound, in particular, an alarm sound.

The aircraft lightning probable area transmission system 1 may be formed of a plurality of computer systems.

Figure 3:
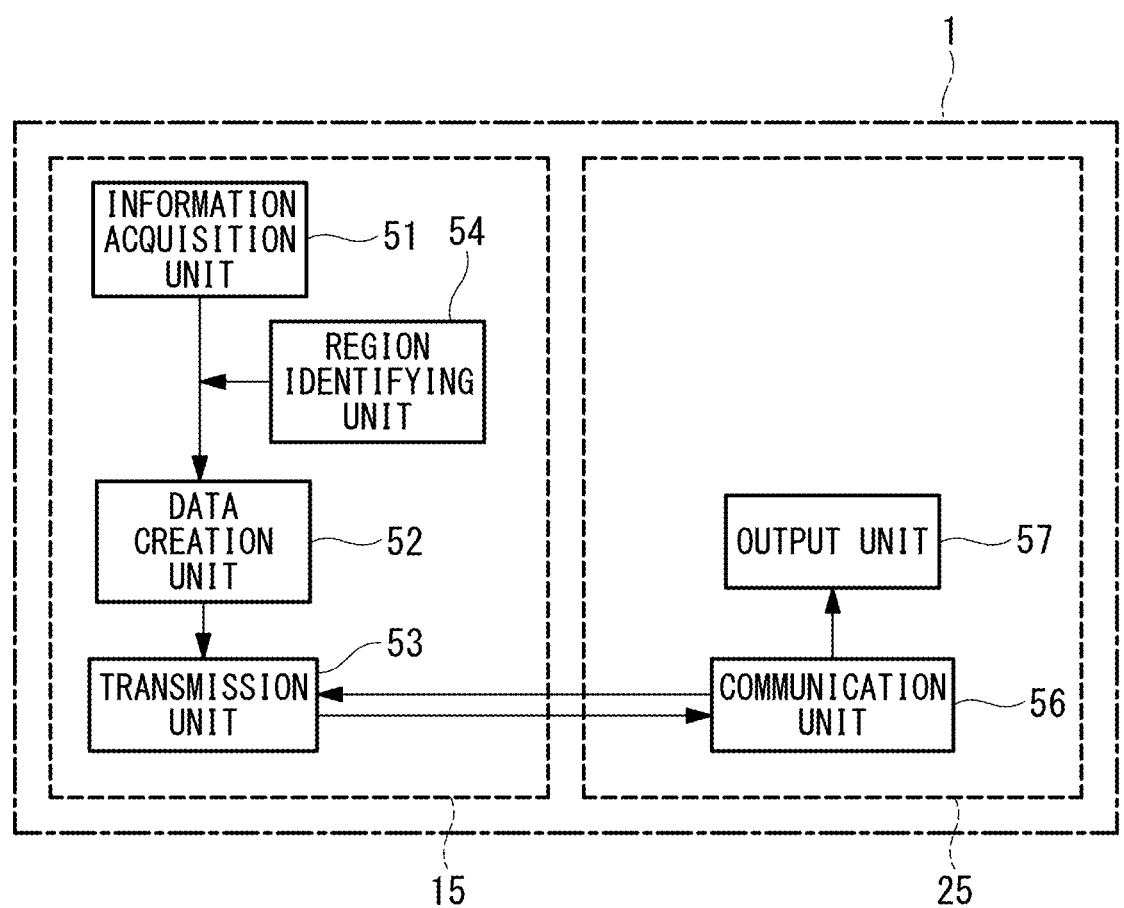
FIG. 3 is a diagram illustrating an example of functions of the aircraft lightning probable area transmission system in some embodiments of the present disclosure.

FIG. 3 is a diagram illustrating an example of functions of the aircraft lightning probable area transmission system in some embodiments of the present disclosure.

As illustrated in FIG. 3, the aircraft lightning probable area transmission system 1 includes an aircraft lightning probable area detection device 15 and an output device 25. The aircraft lightning probable area detection device 15 includes an information acquisition unit 51, a data creation unit 52, a transmission unit 53, and a region identifying unit 54. The output device 25 includes a communication unit 56 and an output unit 57.

A series of processes for implementing the functions of the aircraft lightning probable area transmission system 1 is stored in the secondary storage device 1200 (see FIG. 2) or the like in a form of a program as an example, and various functions are implemented when the CPU (processor) 1100 (see FIG. 2) loads the program into the main memory device 1300 (see FIG. 2) and performs processing and computation of information. Note that the program may be a program to which a form of being preinstalled in the secondary storage device 1200, a form of being provided in a state of being stored in another non-transitory computer readable storage medium, a form of being delivered via a wired or wireless communication unit, or the like may be applied. An example of the non-transitory computer readable storage medium may be a magnetic disk, a magneto-optical disk, a CD-ROM, a DVD-ROM, a semiconductor memory, or the like.

The information acquisition unit 51 illustrated in FIG. 3 acquires aircraft lightning probable information from the weather prediction system 40. The data creation unit 52 uses the aircraft lightning probable information acquired by the information acquisition unit 51 to create an aircraft lightning probable area information on which levels of the expected lightning strike probability and locations are associated with each other, and then converts the aircraft lightning probable area information into text data. The transmission unit 53 transmits the text data, which is the aircraft lightning probable area, to the output device 25. The region identifying unit 54 identifies a region around the airport where the aircraft 20 is scheduled to land from the aircraft lightning probable information. The communication unit 56 further receives the text data transmitted from the aircraft lightning probable area detection device 15. The output unit 57 outputs the text data created in the data creation unit 52 of the aircraft lightning probable area detection device 15 as map data. The output unit 57 may select any output method such as output from a printer provided in the cockpit, output to a display provided in the cockpit, or output to a mobile terminal such as a tablet.

Next, the operation of the aircraft lightning probable area transmission system in some embodiments of the present disclosure is described with reference to the drawings.

Figure 4:
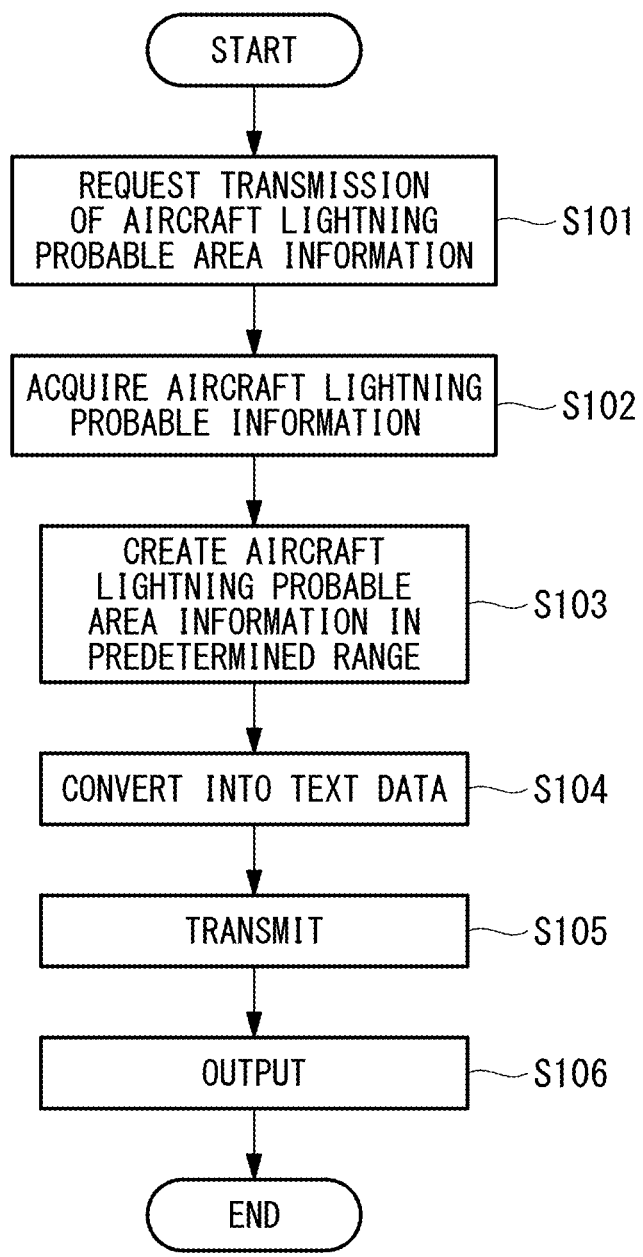
FIG. 4 is a diagram illustrating a control flow of the aircraft lightning probable area transmission system in some embodiments of the present disclosure.

FIG. 4 illustrates a control flow of the aircraft lightning probable area transmission system in some embodiments of the present disclosure.

In step S101, the communication unit 56 of the output device 25 of the aircraft 20 requests the aircraft lightning probable area detection device 15 of the operation center 10 to transmit an aircraft lightning probable area information.

In step S102, the information acquisition unit 51 acquires aircraft lightning probable information from the weather prediction system 40.

Figure 5:
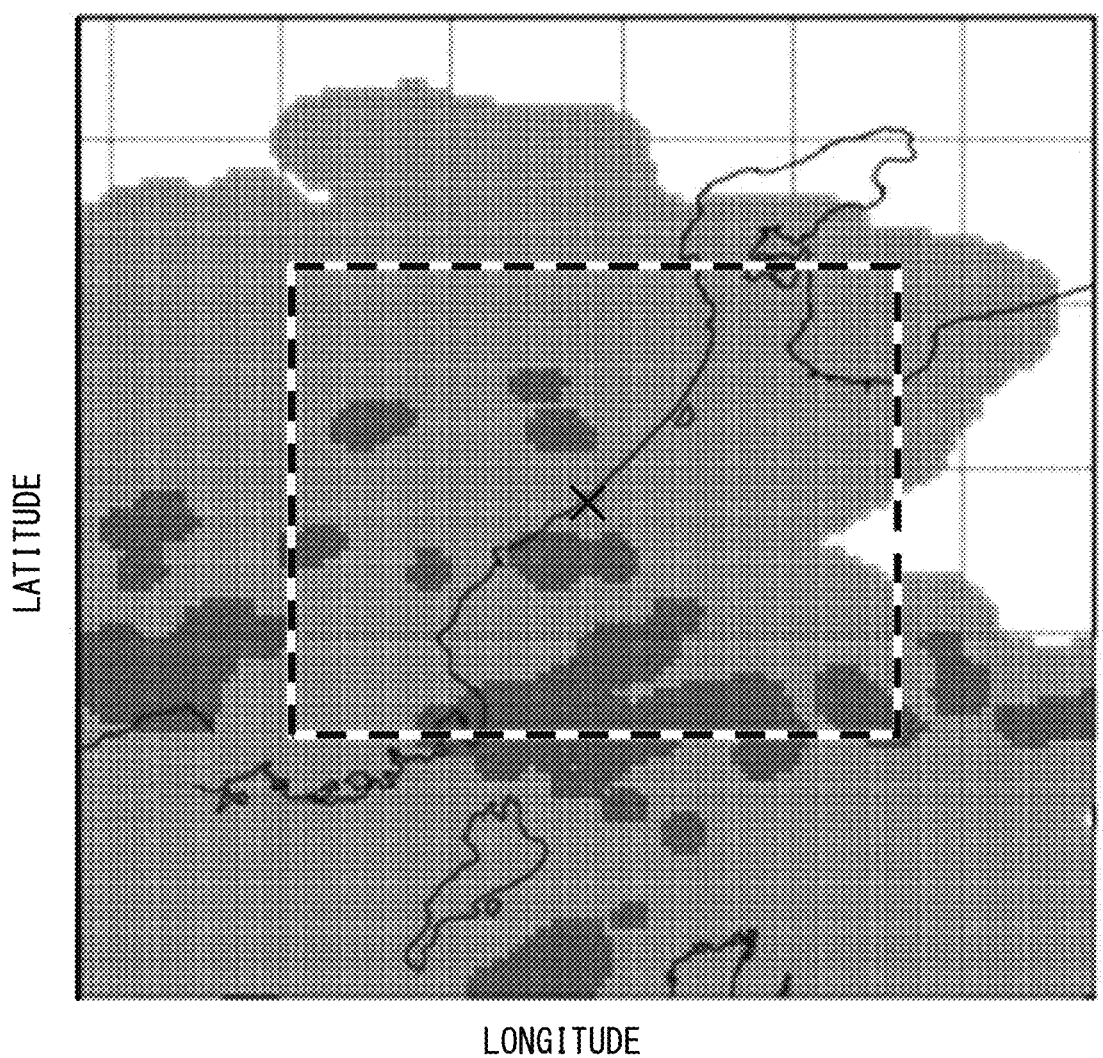
FIG. 5 is a diagram illustrating aircraft lightning probable information in some embodiments of the present disclosure.

FIG. 5 illustrates aircraft lightning probable information in some embodiments of the present disclosure. As illustrated in FIG. 5, the aircraft lightning probable information acquired from the weather prediction system 40 is information indicating the level of an expected lightning strike probability on the map, and the lightning strike probability is indicated by dark and light levels of shading on a map with the latitude on the vertical axis and the longitude on the horizontal axis, for example. In this map, the shaded portions indicate areas having certain lightning strike probabilities (areas where a lightning strike is expected) in which the light shaded portions indicate areas having a low lightning strike probability and the dark shaded portions indicate areas having a high lightning strike probability. The actual aircraft lightning probable information may be displayed in color instead of shading.

In step S103, the data creation unit 52 creates an aircraft lightning probable area information for a predetermined range based on the aircraft lightning probable information acquired by the information acquisition unit 51. For example, when requesting transmission of the aircraft lightning probable area information, the output device 25 of the aircraft 20 simultaneously transmits the location of a landing scheduled airport. The aircraft lightning probable area detection device 15 that has received the location of the landing scheduled airport is scheduled uses the region identifying unit 54 to identify a square-shaped range centered on the location of the landing scheduled airport and having equal vertical and horizontal distances as the area around the airport where the aircraft 20 is scheduled to land. The data creation unit 52 obtains the aircraft lightning probable information on the identified region and creates an aircraft lightning probable area information for a predetermined range. In FIG. 5, the location represented by an x (cross) is the location of the landing scheduled airport is scheduled to land, and the dotted line represents the aircraft lightning probable information on the predetermined range. In the present embodiment, for example, a square-shaped range that is a range of 40 nm (nautical miles) in the vertical and horizontal directions centered on the landing scheduled airport is defined as a predetermined range. The predetermined range does not have to be square, and the size of the range may be changeable.

Before landing, the aircraft 20 has to fly at a low altitude where lightning can occur. In this situation, the region around the airport where the landing is scheduled is identified by the region identifying unit 54, and thereby aircraft lightning probable can be advantageously performed on only a limited region where information on a lightning strike probability is required.

A single piece or multiple pieces of aircraft lightning probable information are acquired for each altitude range in which a lightning strike probability is predicted based on the current position and the flight speed (including an expected deceleration speed due to landing) of the aircraft 20 and the location of a landing scheduled airport. In such a case, the information acquisition unit 51 also acquires an expected time of day and an altitude together with an expected lightning strike probability on the map and passes the information to the data creation unit 52 as aircraft lightning probable information.

In step S104, the data creation unit 52 converts the created aircraft lightning probable area information into text data and then embodies the aircraft lightning probable area information in text.

Figure 6:
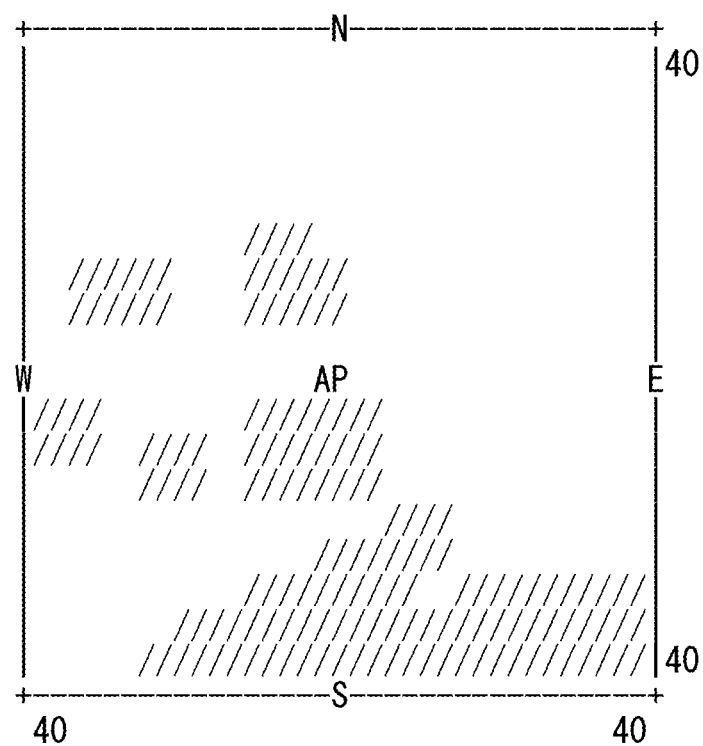
FIG. 6 is a diagram illustrating an aircraft lightning probable area information represented by text data in some embodiments of the present disclosure.

FIG. 6 illustrates an aircraft lightning probable area information in some embodiments of the present disclosure. In FIG. 6, a time of day when a lightning strike is expected is indicated on the first row, and an altitude range is indicated in numerals on the second row. An aircraft lightning probable area information is indicated on the third row and below as quasi-map information using text.

The data creation unit 52 converts, into a slash (/), an area (location) having a certain lightning strike probability expressed by dark shading or light shading in the aircraft lightning probable information in a predetermined range surrounded by the dotted line in FIG. 5, for example. The location of an arrival scheduled airport is further converted into "AP", for example. Further, in addition to display of a frame indicating a predetermined range, display indicating the distance of the range is displayed, and the east, west, south, and north are indicated by E, W, S, and N. In the present embodiment, all the areas (locations) having a certain lightning strike probability are converted into the same text but may be converted into different texts in accordance with the level of the lightning strike probability.

The data creation unit 52 creates an aircraft lightning probable area information so that the north direction of the aircraft lightning probable area information is displayed on the upper side when the text data is output. Thus, in text data, the top, bottom, left, and right represent the directions of the north (N), south (S), west (W), and east (E) of the aircraft lightning probable area information, respectively, and each text thereof is displayed. The directions of the aircraft lightning probable area information are fixed to the arrangement described above. The arrangement of the directions of the aircraft lightning probable area information may be changeable such that the travelling direction is oriented to the upper side, or the like, for example.

Further, the data creation unit 52 may further create an aircraft lightning probable area information at a corresponding scale so that the aircraft lightning probable area information can be zoomed in and out.

In step S105, the transmission unit 53 transmits text data of the aircraft lightning probable area information created by the data creation unit 52 to the output device 25. To perform communication, the aircraft lightning probable area detection device 15 uses an internet facility, and the output device 25 uses the ACARS environment described above.

In step S106, the communication unit 56 that has received text data from the transmission unit 53 passes the text data to the output unit 57. The output unit 57 outputs the text data as map data. Because the text data represents a quasi-map, direct output of the text data makes the text data available as map data. Further, when text data has been converted by encryption or the like, the text data may be recovered by the communication unit 56 or the output unit 57 into the original data.

Although the aircraft lightning probable area information is created and transmitted in response to the request from the aircraft 20 in step S101 in the present embodiment, the aircraft lightning probable area detection device 15 may periodically create and transmit the aircraft lightning probable area information.

As described above, according to the aircraft lightning probable area detection device 15 of the present embodiment, since an aircraft lightning probable area information is transmitted in text data, data capacity can be reduced, and communication cost can be reduced. The existing text data transceiver system provided for communication with the aircraft 20 can be used, and an increase in cost for adding a communication device can be minimized. Further, it is possible to limit required information to that required by a pilot in avoiding a predicted lightning strike area, then create an aircraft lightning probable area information, and transmit data.

[Supplementary Note]

The aircraft lightning probable area detection device, the aircraft lightning probable area transmission system, the aircraft lightning probable area detection method, and the aircraft lightning probable area detection program according to the embodiments described above will be understood as follows.

An aircraft lightning probable area detection device (15) according to the first aspect of the present disclosure includes: an information acquisition unit (51) configured to acquire aircraft lightning probable information indicating a level of an expected lightning strike probability on a map; a data creation unit (52) configured to create text data of an aircraft lightning probable area information on which the level of the expected lightning strike probability and a location are associated with each other by using the aircraft lightning probable information; and a transmission unit (53) configured to transmit the text data to an aircraft (20).

The aircraft lightning probable area information is transmitted in text data, and thereby communication cost can be reduced. A text data transceiver system originally provided for communication with the aircraft can be used, and an increase in cost for adding a communication device can be minimized.

In the first aspect, the aircraft lightning probable area detection device according to the second aspect of the present disclosure may include a region identifying unit (54) configured to identify a region around an airport where the aircraft is scheduled to land in the aircraft lightning probable information, and the data creation unit may create the text data of the aircraft lightning probable area information by using the aircraft lightning probable information for a region identified by the region identifying unit.

Since a region around the airport where the aircraft is scheduled to land is identified, and then the text data of the aircraft lightning probable area information is created, a data volume to be handled can be minimized. Since the aircraft side receives aircraft lightning probable information during landing when a lightning strike may occur, the aircraft can avoid a lightning strike.

In the first and second aspects, in the aircraft lightning probable area detection device according to the third aspect of the present disclosure, the information acquisition unit may acquire the aircraft lightning probable information in accordance with at least one altitude at which the aircraft passes when landing, and the data creation unit may create the text data of the aircraft lightning probable area information for each altitude based on the aircraft lightning probable information acquired by the information acquisition unit.

Since text data of the aircraft lightning probable area information is created on an altitude basis, it is possible to understand aircraft lightning probable in accordance with an altitude. The text data checked by a pilot is a simplified display representing an overview, and the pilot may acquire quasi-three-dimensional aircraft lightning probable while intuitively recognizing and understanding aircraft lightning probable.

In any one of the first to third aspects, in the aircraft lightning probable area detection device according to the fourth aspect of the present disclosure, the data creation unit may represent the altitude of the aircraft lightning probable area information in numerals based on the aircraft lightning probable information and include the numerals in the text data.

This enables the pilot who has referenced the aircraft lightning probable area information to quickly recognize aircraft lightning probable in accordance with an altitude along with the altitude.

In any one of the first to fourth aspects, in the aircraft lightning probable area detection device according to the fifth aspect of the present disclosure, the data creation unit may create the text data of the aircraft lightning probable area information in response to a request for acquisition of the aircraft lightning probable area information from the aircraft side.

Since communication is performed only when the aircraft lightning probable area information is required on the aircraft side, communication cost can be reduced.

In any one of the first to fifth aspects, in the aircraft lightning probable area detection device according to the sixth aspect of the present disclosure, the data creation unit may create the aircraft lightning probable area information so that the north direction of the aircraft lightning probable area information is displayed on the upper side when the text data is output.

Display of the text data of the aircraft lightning probable area information is unified, which enables the pilot to easily recognize the aircraft lightning probable area information.

An aircraft lightning probable area transmission system (1) according to the seventh aspect of the present disclosure includes: the aircraft lightning probable area detection device as described above; and an output device (25) provided to an aircraft, and the output device includes a communication unit (56) configured to receive text data transmitted from the aircraft lightning probable area detection device, and an output unit (57) configured to output the received text data as map data.

Since the aircraft lightning probable area transmission system includes the aircraft lightning probable area detection device and the output device provided to the aircraft, the aircraft lightning probable area transmission system can transmit the aircraft lightning probable area information to the aircraft. This enables the pilot of the aircraft to intuitively recognize the lightning strike area from the aircraft lightning probable area information and perform the flight so as to avoid the lightning strike area. Further, during landing, the pilot is busy with aircraft operation but may quickly recognize the lightning strike area from the simplified aircraft lightning probable area information.

An aircraft lightning probable area detection method (15) according to the eighth aspect of the present disclosure causes a computer to perform: an information acquisition step of acquiring aircraft lightning probable information indicating a level of an expected lightning strike probability on a map; a data creation step of creating text data of an aircraft lightning probable area information on which the level of the expected lightning strike probability and a location are associated with each other by using the aircraft lightning probable information; and a transmission step of transmitting the text data to an aircraft.

An aircraft lightning probable area detection program (15) according to the ninth aspect of the present disclosure causes a computer to perform the aircraft lightning probable area detection method of the eighth aspect.

LIST OF REFERENCE SYMBOLS 1 aircraft lightning probable area transmission system
10 operation center
15 aircraft lightning probable area detection device
20 aircraft
25 output device
30 weather radar
40 weather prediction system
51 information acquisition unit
52 data creation unit
53 transmission unit
54 region identifying unit
56 communication unit
57 output unit
1100 CPU
1200 secondary storage device
1300 main memory device
1400 hard disk drive
1500 communication unit
1800 bus

What is claimed is:

1. An aircraft lightning probable area detection device comprising:
    an information acquisition unit configured to acquire aircraft lightning probable information indicating a level of an expected lightning strike probability on a map;
    a data creation unit configured to create an aircraft lightning probable area information on which the level of the expected lightning strike probability and a location are associated with each other by using the aircraft lightning probable information and configured to convert the aircraft lightning probable area information into text data; and
    a transmission unit configured to transmit the text data to an aircraft, wherein
    the map is constructed using the text data and each character of the text data indicates the level of the expected lightning strike probability at a respective location within a simplified appearance of the map.

2. The aircraft lightning probable area detection device according to claim 1 further comprising
    a region identifying unit configured to identify a region around an airport where the aircraft is scheduled to land in the aircraft lightning probable information, wherein
    the data creation unit creates the text data of the aircraft lightning probable area information by using the aircraft lightning probable information for a region identified by the region identifying unit.

3. The aircraft lightning probable area detection device according to claim 2, wherein
    the information acquisition unit acquires the aircraft lightning probable information in accordance with at least one altitude at which the aircraft passes when landing, and
    the data creation unit creates the aircraft lightning probable area information for each altitude based on the aircraft lightning probable information acquired by the information acquisition unit and converts the aircraft lightning probable area information into the text data.

4. The aircraft lightning probable area detection device according to claim 3, wherein the data creation unit represents the altitude of the aircraft lightning probable area information in numerals based on the aircraft lightning probable information and includes the numerals in the text data.

5. The aircraft lightning probable area detection device according to claim 1, wherein the information acquisition unit acquires the aircraft lightning probable information in accordance with at least one altitude at which the aircraft passes when landing, and the data creation unit creates the aircraft lightning probable area information for each altitude based on the aircraft lightning probable information acquired by the information acquisition unit and converts the aircraft lightning probable area information into the text data.

6. The aircraft lightning probable area detection device according to claim 5, wherein the data creation unit represents the altitude of the aircraft lightning probable area information in numerals based on the aircraft lightning probable information and includes the numerals in the text data.

7. The aircraft lightning probable area detection device according to claim 1, wherein the data creation unit creates the aircraft lightning probable area information in response to a request for acquisition of the aircraft lightning probable area information from an aircraft side and converts the aircraft lightning probable area information into the text data.

8. The aircraft lightning probable area detection device according to claim 1, wherein the data creation unit creates the aircraft lightning probable area information so that a north direction of the aircraft lightning probable area information is displayed on an upper side of a display when the text data is output.

9. An aircraft lightning probable area transmission system comprising:

the aircraft lightning probable area detection device according to claim 1; and an output device provided to an aircraft, wherein the output device comprising a communication unit configured to receive text data transmitted from the aircraft lightning probable area detection device, and an output unit configured to output the received text data as map data.

10. An aircraft lightning probable area detection method performed by a computer, the method comprising:

an information acquisition step of acquiring aircraft lightning probable information indicating a level of an expected lightning strike probability on a map;

a data creation step of creating an aircraft lightning probable area information on which the level of the expected lightning strike probability and a location are associated with each other by using the aircraft lightning probable information and converting the aircraft lightning probable area information into text data; and a transmission step of transmitting the text data to an aircraft, wherein the map is constructed using the text data and each character of the text data indicates the level of the expected lightning strike probability at a respective location within a simplified appearance of the map.

11. A non-transitory tangible computer-readable storage medium storing an aircraft lightning probable area detection program for causing a computer to perform the aircraft lightning probable area detection method according to claim 10.

* * * * *